US006913337B2

(12) United States Patent
Kuronuma et al.

(10) Patent No.: US 6,913,337 B2
(45) Date of Patent: Jul. 5, 2005

(54) IMAGE FORMATION SYSTEM, RECORDING APPARATUS, AND RECORDING CONTROL METHOD

(75) Inventors: Akira Kuronuma, Tokyo (JP); Souhei Tanaka, Kanagawa (JP); Hidehiko Kanda, Kanagawa (JP); Takeaki Nakano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/413,485

(22) Filed: Apr. 15, 2003

(65) Prior Publication Data

US 2003/0193536 A1 Oct. 16, 2003

(30) Foreign Application Priority Data

Apr. 15, 2002  (JP) ........................................ 2002-112659

(51) Int. Cl.[7] .................................................. B41J 29/38
(52) U.S. Cl. ........................... 347/9; 358/1.17; 358/1.9
(58) Field of Search .............................. 347/9, 14, 43; 358/1.9, 1.16, 1.17

(56) References Cited

U.S. PATENT DOCUMENTS

| 4,313,124 A | 1/1982 | Hara .......................... 347/57 |
| 4,345,262 A | 8/1982 | Shirato et al. ................ 347/10 |
| 4,459,600 A | 7/1984 | Sato et al. .................... 347/47 |

(Continued)

FOREIGN PATENT DOCUMENTS

| EP | 0 709 214 | 5/1996 | |
| EP | 0 802 503 | 10/1997 | |
| EP | 1 120 253 | * 8/2001 | ............. B41J/2/01 |
| JP | 54-56847 | 5/1979 | |
| JP | 58-146929 | 9/1983 | |
| JP | 59-121432 | 7/1984 | |
| JP | 59-123670 | 7/1984 | |
| JP | 59-138461 | 8/1984 | |
| JP | 60-71260 | 4/1985 | |
| JP | 11-192746 | 7/1999 | |
| JP | 11-259248 | 9/1999 | |

OTHER PUBLICATIONS

U.S. Appl. No. 10/411,111, filed Apr. 11, 2003, Jiro Moriyama, Hidehiko Kanda.
U.S. Appl. No. 10/411,189, filed Apr. 11, 2003, Jiro Moriyama, Hidehiko Kanda.
U.S. Appl. No. 10/411,298, filed Apr. 11, 2003, Hidehiko Kanda, Jiro Moriyama.
U.S. Appl. No. 10/411,527, filed Apr. 11, 2003, Jiro Moriyama, Hidehiko Kanda.
U.S. Appl. No. 10/413,144, filed Apr. 15, 2003, Toru Nakayama, Souhei Tanaka, Tetsushi Kono, Takeaki Nakano.
U.S. Appl. No. 10/413,146, filed Apr. 15, 2003, Souhei Tanaka, Akira Kuronuma, Toru Nakayama, Tetsushi Kono.

*Primary Examiner*—Lamson Nguyen
*Assistant Examiner*—Blaise Mouttet
(74) *Attorney, Agent, or Firm*—Fitzpatrick, Cella, Harper & Scinto

(57) ABSTRACT

To reduce the data processing load on a recording apparatus, an information processing apparatus and the recording apparatus cooperate to correct registration errors. The information processing apparatus divides a recording area of the recording apparatus into a plurality of partial areas and makes a first correction on a recording position of image data for each partial area; the correction is made for color data items and in pixels. The information processing apparatus generates image data that conforms to the corrected recording position, as well as setting information for controlling the recording apparatus to record the image data. The recording apparatus makes a second correction on the recording position of the image data in fractions of a pixel based on the setting information generated by the information processing apparatus and controls recording of the image data based on the corrected recording position.

15 Claims, 13 Drawing Sheets

U.S. PATENT DOCUMENTS

| | | | |
|---|---|---|---|
| 4,463,359 A | 7/1984 | Ayata et al. | 347/56 |
| 4,558,333 A | 12/1985 | Sugitani et al. | 347/65 |
| 4,608,577 A | 8/1986 | Hori | 347/66 |
| 4,723,129 A | 2/1988 | Endo et al. | 347/56 |
| 4,740,796 A | 4/1988 | Endo et al. | 347/56 |
| 5,412,483 A * | 5/1995 | Ludlow et al. | 358/401 |
| 5,436,863 A * | 7/1995 | Kogure | 365/189.04 |
| 5,751,327 A * | 5/1998 | De Cock et al. | 347/130 |
| 5,838,888 A | 11/1998 | Oda | 358/1.16 |
| 5,914,731 A | 6/1999 | Yano et al. | 347/9 |
| 5,923,344 A * | 7/1999 | Norum et al. | 347/9 |
| 6,036,297 A * | 3/2000 | Hayasaki | 347/13 |
| 6,097,499 A | 8/2000 | Casey et al. | 358/1.16 |
| 6,120,129 A | 9/2000 | Iwasaki et al. | 347/43 |
| 6,261,010 B1 | 7/2001 | Maeda | 400/76 |
| 6,328,403 B1 | 12/2001 | Iwasaki et al. | 347/15 |
| 2001/0005211 A1 | 6/2001 | Minowa | |
| 2002/0191068 A1 * | 12/2002 | O'Hara et al. | 347/237 |

* cited by examiner

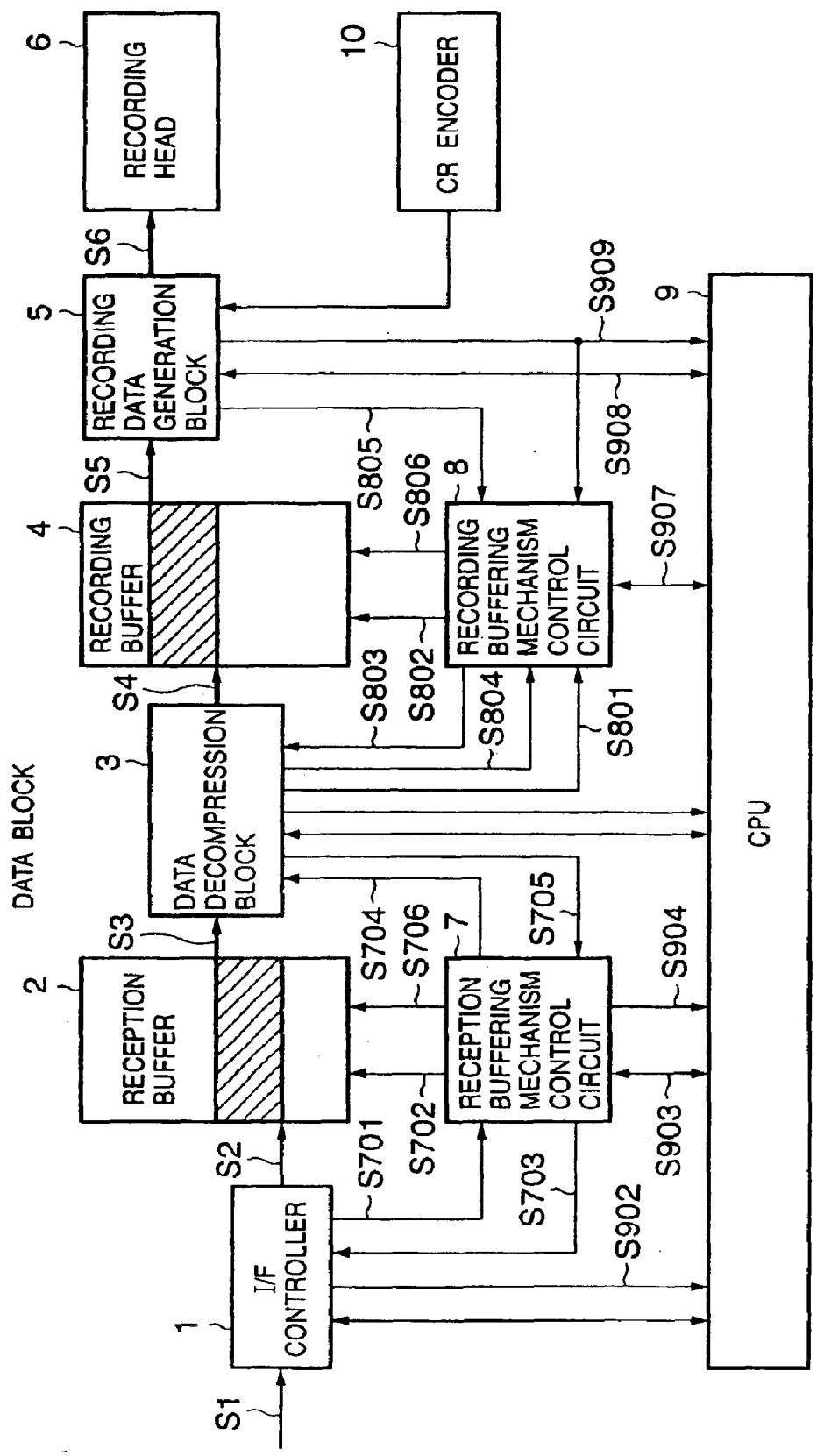

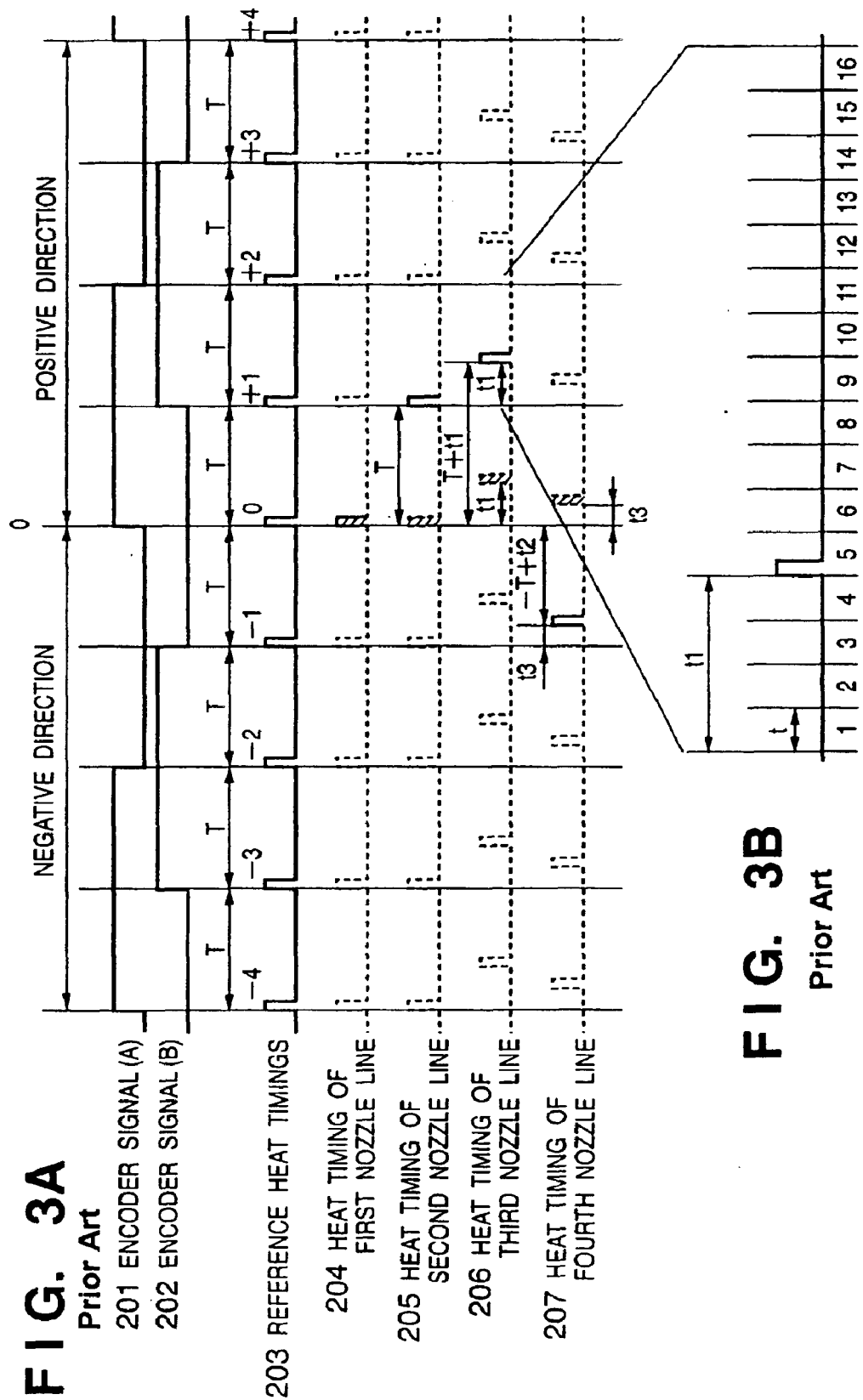

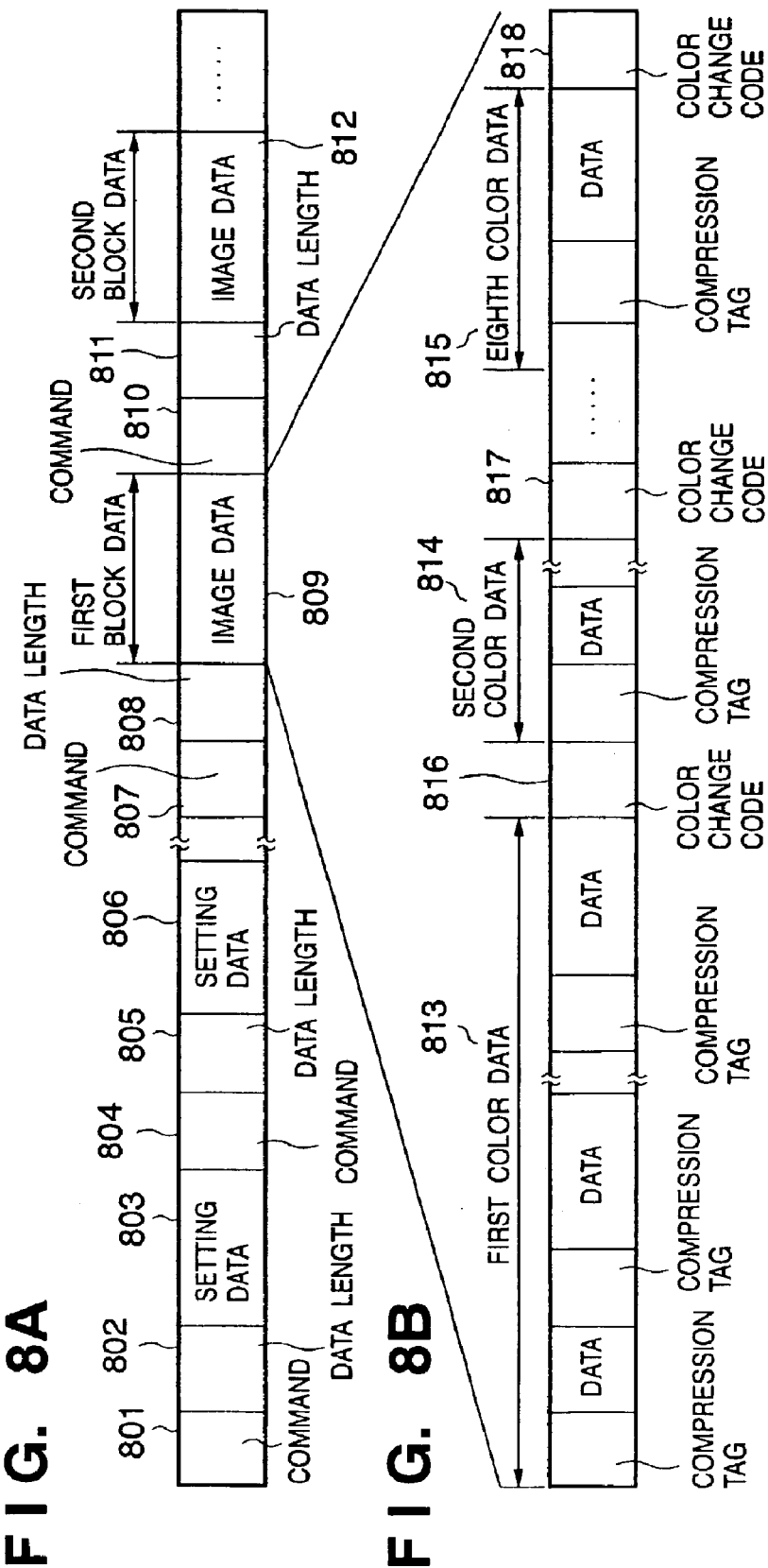

FIG. 9

| FIRST BLOCK | SECOND BLOCK | THIRD BLOCK | FOURTH BLOCK | FIFTH BLOCK |
|---|---|---|---|---|
| FIRST COLOR DATA | FIRST COLOR DATA | FIRST COLOR DATA | FIRST COLOR DATA | FIRST COLOR DATA |
| SECOND COLOR DATA | SECOND COLOR DATA | SECOND COLOR DATA | SECOND COLOR DATA | SECOND COLOR DATA |
| THIRD COLOR DATA | THIRD COLOR DATA | THIRD COLOR DATA | THIRD COLOR DATA | THIRD COLOR DATA |
| FOURTH COLOR DATA | FOURTH COLOR DATA | FOURTH COLOR DATA | FOURTH COLOR DATA | FOURTH COLOR DATA |
| FIFTH COLOR DATA | FIFTH COLOR DATA | FIFTH COLOR DATA | FIFTH COLOR DATA | FIFTH COLOR DATA |
| SIXTH COLOR DATA | SIXTH COLOR DATA | SIXTH COLOR DATA | SIXTH COLOR DATA | SIXTH COLOR DATA |
| SEVENTH COLOR DATA | SEVENTH COLOR DATA | SEVENTH COLOR DATA | SEVENTH COLOR DATA | SEVENTH COLOR DATA |
| EIGHTH COLOR DATA | EIGHTH COLOR DATA | EIGHTH COLOR DATA | EIGHTH COLOR DATA | EIGHTH COLOR DATA |

IMAGE FORMATION SYSTEM, RECORDING APPARATUS, AND RECORDING CONTROL METHOD

FIELD OF THE INVENTION

The present invention relates to an image formation system that controls a recording position in a recording apparatus, the recording apparatus pertaining to the system, and a recording control method for the system and the apparatus.

BACKGROUND OF THE INVENTION

Recording with an ink-jet technique involves discharging ink from ink discharge orifices that are aligned on a recording head and are substantially orthogonal to the horizontal scanning direction while moving the recording head across a recording medium in the horizontal scanning direction. If timings of the ink discharges are inconsistent, a problem arises that the inconsistency is directly reflected in a recorded image as the recording head horizontally scans, leading to inconsistency in image density. To prevent this inconsistency, an apparatus that generates pulses at regular distances has been conventionally used to perform recording by using the outputs of the apparatus as recording triggers and thereby to suppress the recording inconsistency.

With improvement in image quality, another approach to suppressing the inconsistency in density has been recently taken. As disclosed in Japanese Patent Laid-Open No. 11-192746, this involves generating pulses from pulse outputs multiplied by N in a multiplier circuit and using the multiplied pulses as triggers.

FIGS. 3A and 3B describe control for suppressing the recording inconsistency. Reference heat timings 203 in FIG. 3A are generated from an encoder signal (A) 201 and an encoder signal (B) 202. This reference heat timing signal is a signal for controlling the position of a carriage on which a recording head is mounted. Based on this signal, a heat timing of a first nozzle line arranged on the recording head is determined (204). For the sake of simplicity, in this example, the heat timing of the first nozzle line (204) is controlled as the same timing as the one in the reference heat timings (203). Reference 205 denotes a heat timing of a second nozzle line, reference 206 denotes a heat timing of a third nozzle line, and reference 207 denotes a heat timing of a fourth nozzle line.

The heat timing of the second nozzle line 205 illustrates that it is controlled with a shift by one cycle (T) of the reference heat timings compared to the first nozzle line. The heat timing of the third nozzle line 206 illustrates that there is a timing shift by one cycle (T) and a period (t1) shorter than one cycle (less than one cycle) of the reference heat timings compared to the first nozzle line.

FIG. 3B shows a timing chart in which a cycle (T) of the reference heat timings is divided into 16 periods, wherein a period is defined as t. The timing shift t1 of less than one cycle in FIG. 3A corresponds to a timing 5t in FIG. 3B.

The heat timing of the fourth nozzle line 207 illustrates that there is a timing shift by one cycle (T) and a period (t2) less than one cycle in the negative direction compared to the first nozzle line. In actual control, a shift by one heat timing (cycle T) is generally addressed by shifting pixel data to be output (recorded) rather than shifting the heat timing, whereas a shift of less than one heat timing (period t) is generally addressed by actually shifting the heat timing. In performing such control, controlling the heat timings of the nozzle lines in fractions of a cycle as shown by the hatched pulses can make the heat timings accurately determined. Therefore, controlling in such a manner can provide recording with few misalignments of pixels.

In this example, waveforms of a phase A (201) and a phase B (202) of the encoder signals are always the same and are exactly 90° out of phase with each other for the sake of simplicity. In practice, the phases A and B in FIG. 3A may have different cycle lengths due to eccentricity of a motor or other reasons. In that case, control may include processing such as determining the cycle (T) by dividing a last measured value by four.

The shift amounts in heat timings (cycles T) and in fractions of a heat timing (periods t) are maintained separately for each nozzle line. These values may be factory-preset or may be input by a user based on a result of printed patterns for determining the shift amounts.

In recent years, semiconductor circuits for controlling recording apparatuses are often integrated to reduce the cost of the recording apparatuses. For example, a CPU, a logic circuit, and RAM and so on are integrated into one chip. In this case, the capacity of the RAM mounted on the integrated chip is often reduced under constraints of the chip. The recording apparatuses that use such a chip adopt various control schemes to process data with a small memory capacity.

For example, the amount of image data is reduced or the capacity of the RAM is saved by storing data for the discharge orifice lines (nozzle lines) aligned in the horizontal scanning direction except for data corresponding to distances from an end nozzle line to each of the other nozzle lines.

FIGS. 4A and 4B schematically show the details of saving the memory capacity. In particular, FIG. 4A schematically shows data required when the memory is not saved. In the figure, 410 denotes a carriage, and 401 to 404 denote the first to fourth nozzle lines arranged on the carriage 410. These nozzle lines are spaced apart at a pitch of "d" on the carriage. A recording medium 412 has a recording area 411, in which the carriage 410 scans the recording medium at a constant speed in the horizontal scanning direction and forms an image based on the stored data. Because recording is not performed while the carriage accelerates and decelerates, the nozzle lines cannot record data even if they have the data at areas where the carriage starts and reaches the constant speed and where the carriage drops the speed from the constant speed and stops. Therefore, if the RAM stores a full amount of data for the carriage movement, each nozzle line inevitably has blank image data (null data) indicated by hatching at its left or right end. These hatched portions are unnecessary data.

In the case of FIG. 4A, once any one of the nozzle lines is enabled for recording, other nozzle lines are also enabled for recording. That is, separate enable control is not required for each nozzle line, and this makes the control rule simple. A heat enable signal common to all nozzle lines can be used to read the image data and transfer it to the recording head.

FIG. 4B shows timings of heat enable signals where the amount of the image data is reduced. This is done by storing the data for the discharge orifice lines aligned in the horizontal scanning direction except for data corresponding to distances from an end nozzle line to each of the other nozzle lines (that is, not storing data for the hatched portions in FIG. 4A). In this case, applying a dedicated control signal to each nozzle line eliminates the need to store the unnecessary data in a data storage area. However, the heat enable signals have to be separately controlled for the respective nozzle lines, and this makes the control rule more complicated comparing to the case of FIG. 4A.

Traditionally, the capacity of the RAM has not been so important because an external RAM has been used, so that the control as shown in FIG. 4A has been general. If circuit boards for controlling recording are integrated into one chip as mentioned above, the control as shown in FIG. 4B is adopted because it can save more memory capacity. Since the control as shown in FIG. 4B has been adopted in low-end recording apparatuses, correction in pixels has been enough for the heat timing shifts.

Next, recording buffers used in conventional recording apparatuses will be described. In FIG. 7A, the vertical direction corresponds to the width of a nozzle line. For example, if the nozzle line has 128 nozzles, it has a length for 128 rasters accordingly. The horizontal direction corresponds to the scanning direction of the recording head, and its length corresponds, for example, to 2880 dots (2880 columns). For 360 DPI, it corresponds to 8 inches. The figure shows a buffer 701 storing cyan (C) data, and a buffer 702 storing magenta (M) data. Each buffer stores data for one dot as a shaded portion at a position of 513th column.

When the data is recorded on a recording medium 700 such as recording paper, the shaded portion 703 formed of the cyan (C) dot is recorded at a position of the 513th column (FIG. 7B). Here, if the magenta (M) data has a pixel error (registration error) for one pixel, the shaded portion 704 formed of the magenta dot is recorded at a position of the 514th column. To correct this registration error, the magenta data is read earlier than the cyan data by one pixel.

The "registration" refers to processing by which recording-data decomposed into color components of ink (yellow (Y), magenta (M), cyan (C), and black (B)) is combined into the original color recording data. In the additive process of recording processing, misalignment of the combined colors may occur, which is referred to as a "registration error" (simply called a "regi-error" hereafter). Processing for resolving the regi-error is referred to as "regi-error correction."

It is essential to efficiently utilize memory areas in that the capacity of memory in recording apparatuses has to be reduced as described above.

Further, to correct regi-errors that occur as described above, it is required to efficiently read image data stored in the memory in combination with the efficient utilization of the memory areas.

SUMMARY OF THE INVENTION

To solve the above objects, the invention provides an image formation system, a recording apparatus pertaining to the system, a recording control method, and so on, which mainly have the following features.

That is, the present invention provides an image formation system having an information processing apparatus that generates image data and a recording apparatus that performs recording based on the generated image data, wherein the information processing apparatus comprises:

first correction means for correcting a recording position of image data for each partial area, the correction being made for color data items and in pixels; and generation means for generating the image data that conforms to the recording position corrected by the first correction means and generating setting information for controlling the recording apparatus to record the image data, and the recording apparatus comprises:

second correction means for correcting the recording position of the image data in fractions of a pixel based on the setting information generated by the generation means; and recording control means for controlling recording of the image data based on the recording position corrected by the second correction means.

According to the another aspect of the invention, the present invention provides a recording apparatus that divides a recording area in a scanning direction of a recording head into a plurality of partial areas and stores image data for each partial area in a buffer in order to perform recording by causing a carriage having the recording head to scan a recording medium, the recording apparatus comprising:

reception means for receiving the image data generated by an information processing apparatus, the image data having a recording position corrected in pixels;

a write controller for controlling write address information on the image data for each partial area in order to store the received image data in the buffer, the write address information being controlled in pixels;

a read controller for controlling read address information for reading the image data stored in the buffer; and recording data generation means for generating recording data according to the image data that has been read based on the read address information.

According to the another aspect of the invention, the present invention provides a recording control method for controlling an information processing apparatus that generates image data and a recording apparatus that performs recording based on the generated image data, the method comprising:

a first correction step of correcting a recording position of image data for each partial area, the correction being made for color data items and in pixels;

a generation step of generating the image data that conforms to the recording position corrected by processing in the first correction step and generating setting information for controlling the recording apparatus to record the image data;

a second correction step of correcting the recording position of the image data in fractions of a pixel based on the setting information generated by processing in the generation step; and a recording control step of controlling recording of the image data based on the recording position corrected by processing in the second correction step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a block diagram showing a recording control section of the recording apparatus in the first embodiment;

FIGS. 3A and 3B describe pixel shifts in a conventional recording apparatus;

FIGS. 8A and 8B show a data structure of data transferred from the host and stored in a reception buffer in the first embodiment;

FIG. 9 shows a data structure of the recording buffer that stores image data in the first embodiment;

DETAILED DESCRIPTION OF THE PREFERRED EMBODIMENTS

Preferred embodiments of the present invention will now be described in detail in accordance with the accompanying drawings.

The embodiments to be described below are described in regard to a printer as an example of a recording apparatus using an ink-jet recording technique.

The term "record" (also expressed as "print") as used herein refers to forming information which has a meaning, such as characters and figures, as well as more broadly to forming images, marks, and patterns on a recording medium or processing the recording medium regardless of whether they have meaning or not and whether or not they can be visually perceived by a human.

The term "recording medium" refers to paper used in common recording apparatuses, as well as more broadly to cloth, plastic films, metal plates, glass, ceramic, wood, leather, and other materials that can accept ink.

Further, the term "ink" (also referred to as a "liquid"), which should also be broadly interpreted as with the above definition of "record (print)", refers to liquids that can be applied to the recording medium for forming images, marks, and patterns, or for processing the recording medium, or for processing the ink (for example, solidifying or insolubilizing color agents in the ink applied to the recording medium).

[Overview of the Apparatus]

Figure 12:
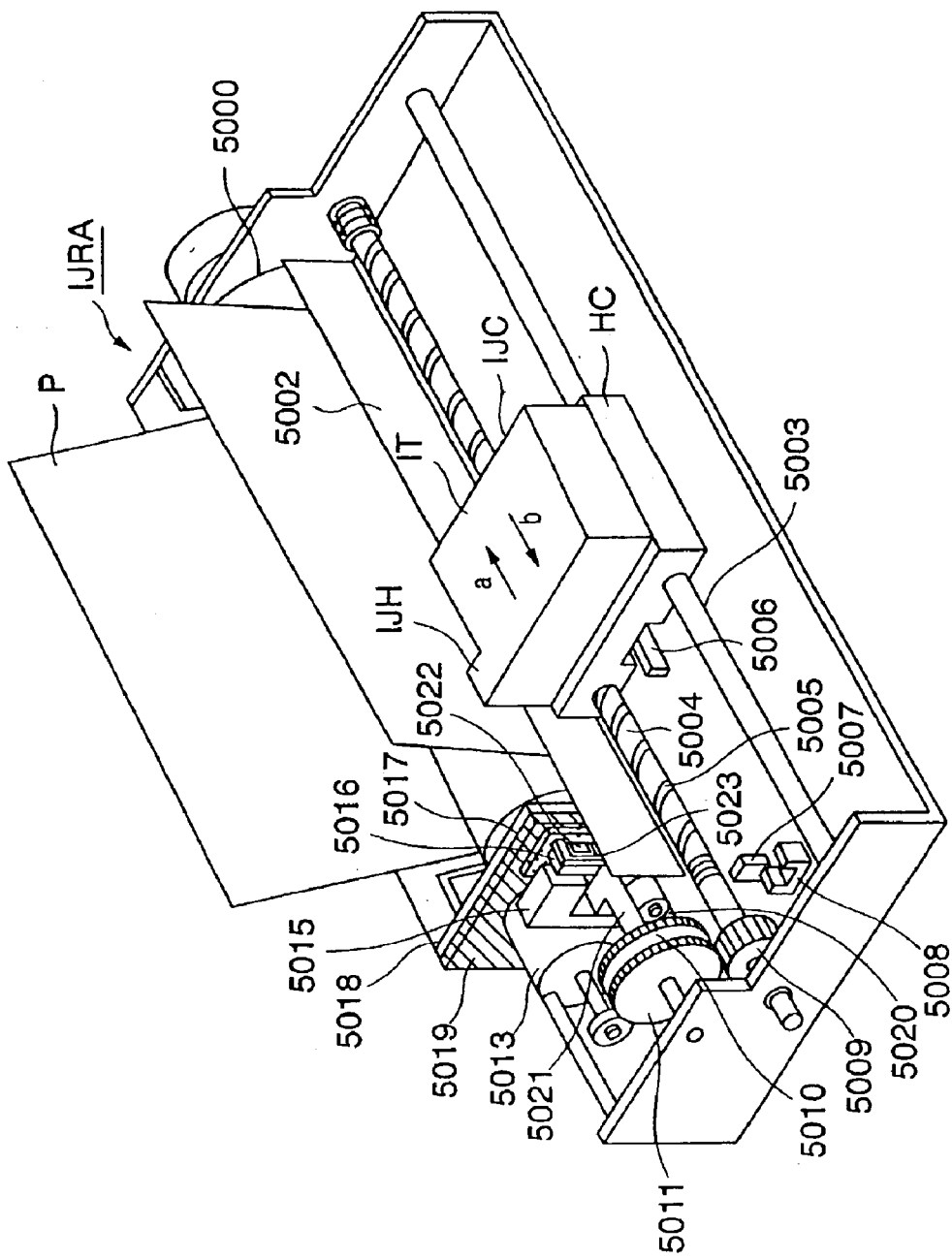
FIG. 12 is an external view of a printer according to a preferable embodiment of the invention.

FIG. 12 is an external perspective view showing a schematic configuration of an ink-jet printer IJRA, a representative embodiment of the invention. In FIG. 12, a lead screw 5004 rotates in unison with a forward or backward rotation of a driving motor 5013 via driving force transmission gears 5009 to 5011. A carriage HC engaging with a spiral groove 5005 in the lead screw 5005 has a pin (not shown) and shuttles in the directions indicated by arrows a and b with the support of a guide rail 5003. Mounted on the carriage HC is an integrated ink-jet cartridge IJC that includes a recording head IJH and an ink tank IT.

The numeral 5002 denotes a paper retainer plate that presses recording paper P against a platen 5000 along the moving direction of the carriage HC. The numerals 5007 and 5008 denote a photo coupler, which is a home position detector to recognize the existence of a carriage lever 5006 in this area for operations such as switching the rotation direction of the motor 5013.

The numeral 5016 denotes a member for supporting a cap member 5022 that caps the front of the recording head IJH. The numeral 5015 denotes a suction device that applies suction to the inside of the cap. It performs suction recovery of the recording head through an opening 5023 of the cap. The numeral 5017 denotes a cleaning blade, and the numeral 5019 denotes a member that makes the blade movable back and forth. They are supported on a supporting plate 5018 of the main body. It is to be understood that any known cleaning blades may be applied to the embodiment besides this configuration.

The numeral 5021 denotes a lever for starting suction recovery, which moves with the movement of a cam 5020 engaging with the carriage. The driving force from the driving motor for this movement is controlled by a known transmission mechanism such as clutch shifting.

These capping, cleaning, and suction recovery are adapted so that desired processing can be performed in their respective positions through operations of the lead screw 5004 when the carriage returns to the home position area. However, any manners that enable desired operations with known timings may be applied to the embodiment.

In addition, although the ink tank IT and the recording head IJH may be integrated to form the changeable ink cartridge IJC, they may be separable so that only the ink tank IT can be changed when it runs out of ink.

Figure 13:
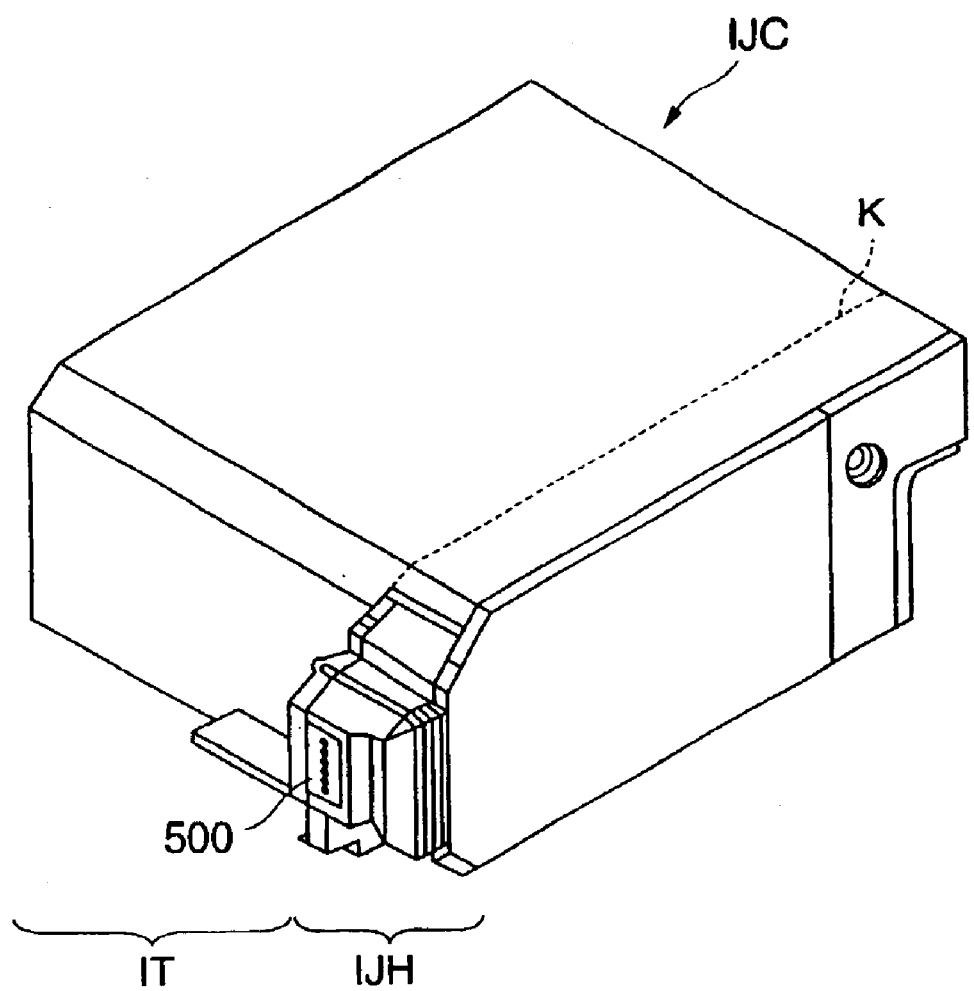
FIG. 13 shows an ink-jet cartridge of the printer in FIG. 12.

FIG. 13 is an external perspective view showing a configuration of the ink cartridge IJC with its ink tank and head separable from each other. As shown in FIG. 13, the ink cartridge IJC has the ink tank IT and the recording head IJH, which are separable from each other at a borderline K. The ink cartridge IJC is provided with an electrode (not shown) for receiving an electric signal supplied by the carriage HC when the ink cartridge is mounted on the carriage HC. The recording head IJH is driven by the electric signal as described above and discharges ink.

In FIG. 13, the numeral 500 denotes a line of ink discharge orifices. The ink tank IT is provided with a fibered or porous ink-absorber for holding the ink.

Now, a control mechanism for controlling recording of the above described apparatus will be described.

[First Embodiment]

FIG. 2 is a block diagram showing a recording control section of the recording apparatus according to the embodiment of the invention. The reference numeral 1 denotes an interface controller. From data transferred by a host computer (not shown) through an interface signal line S1, the interface controller 1 extracts data required for operations of the recording apparatus and image data, and it temporarily holds the data. The data extracted by the interface controller 1 is stored in a reception buffer through a signal line S2.

The reception buffer 2 consists of memory such as an SRAM or DRAM. The data stored in the reception buffer has a structure shown in FIGS. 8A and 8B.

As shown by the data structure of the reception buffer in FIG. 8A, data is stored as, from left, "command" 801, "data length" 802, and "setting data" 803, followed by "command" 804, "data length" 805, and "setting data" 806. This shows that the data items transferred in time series are stored at sequential addresses in the reception buffer. For example the setting data 806 shown contains information on settings about execution of paper feed and the amount of paper feed, information on the number of recording heads to be used, and so on. It is only after all information items specified in the setting data are obtained that the recording apparatus can perform recording. After these data items, image data 809 and 812 to be recorded (which are preceded by data items 807, 808 and data items 810, 811) are stored in the reception buffer 2.

Reference 810 denotes "command" and reference 811 denotes "data length". The image data 809 and 812 is data resulting from dividing data required by the recording head for recording in one scan of the recording medium into blocks of a smaller data amount. Therefore, the image data is divided into the blocks, which are sequentially stored as the first block data 809, the second block data 812, etc.

FIG. 8B shows a data structure of a block of image data in detail. As shown, data items for different colors 813 to 815 are sequentially stored as compressed data. The color data items are separated by "color change codes" 816, 817, and 818.

For example, suppose that the color data items for four colors (cyan, yellow, magenta, and black) are given, and the recording head used has nozzle lines arranged in the scanning direction, wherein each line has 64 nozzles and each color is assigned two lines. Each color data item corresponds to data for one nozzle line. Therefore, color data items for two nozzle lines are stored for each of the four colors; that is, compressed color data items for the first to eighth colors are stored as the image data in one block data. The nozzles in the nozzle lines are aligned in the direction in which the recording medium is conveyed. For example, the first and second color data items are for cyan, the third and fourth color data items are for magenta, the fifth and sixth color data items are for yellow, and the seventh and eights color data items are for black.

FIG. 9 shows a data structure of a recording buffer that stores the image data. For example, recording for 5 inches is possible at the maximum in one scan. If one block data is of the size that allows recording for about 1 inch in the scanning direction, processing and recording image data for five blocks provides a complete image for one scan. Therefore, the first to fifth blocks are deployed in the scanning direction of the recording head, and each block data stores the first to eighth color data items. The length of each color data item stored in each block corresponds to the number of the nozzles of the recording head.

Figure 11:
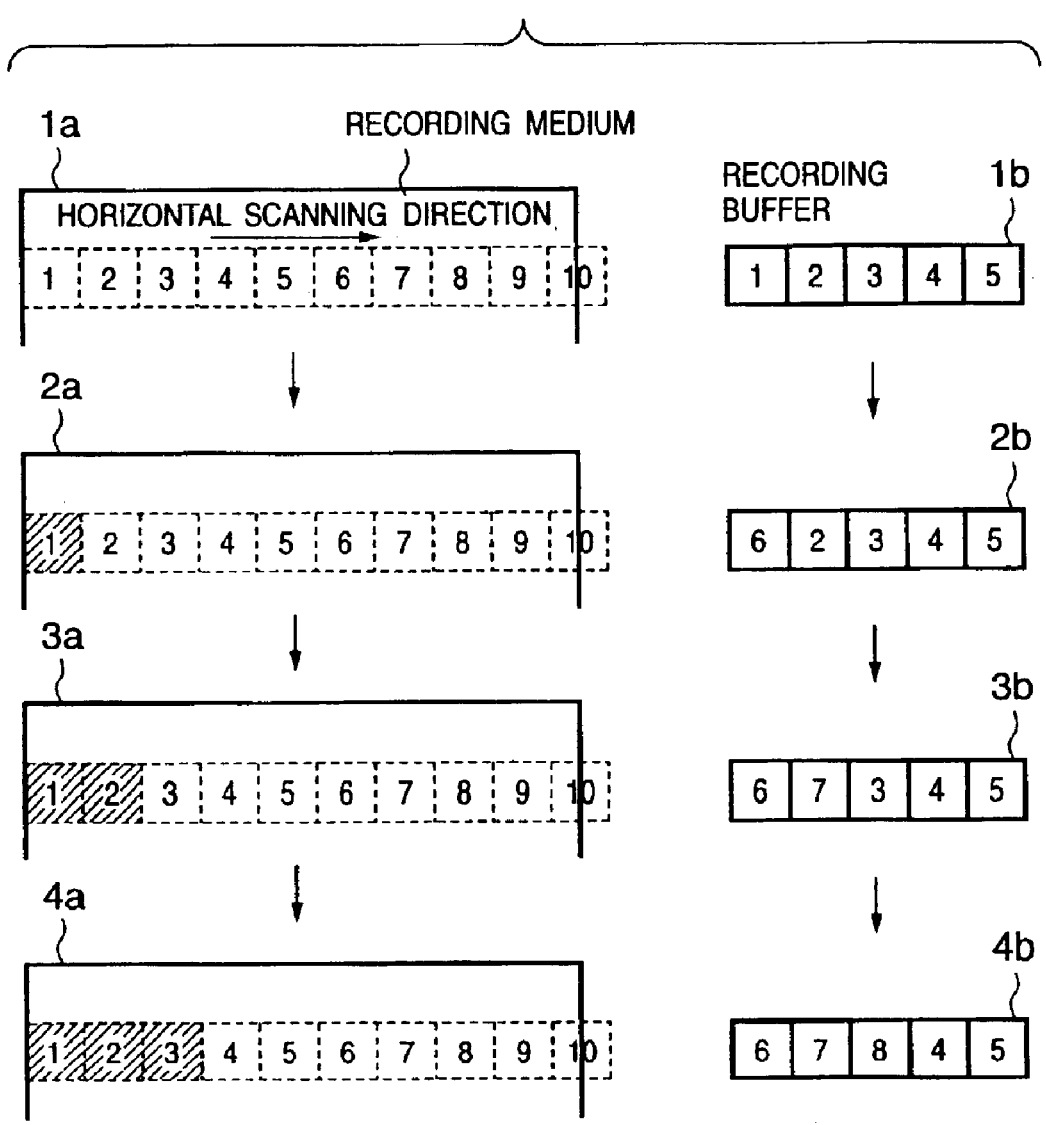
FIG. 11 describes write and read control on the recording buffer on a block basis in the first embodiment.

The control for writing and reading the blocked data to and from the buffer will be described with reference to FIG. 11. Here, the horizontal scanning direction on the recording medium is divided into 10 areas from 1 to 10 (1a), so that processing and recording of the image data for the 10 areas provides a complete image for one scan. FIG. 11 (1B), (2B), (3B), and (4B) show how the data is stored in the recording buffer.

The recording buffer 4 (FIG. 9) stores the image data for five blocks (FIG. 11 (1b)), and the recording apparatus starts the recording head's scan in the horizontal scanning direction. Once the first stored recording data (the block 1 in FIG. 11 (1b)) has been recorded (2a), the image data for the next block (the sixth block) is stored in the empty area of the recording buffer (2b) (recorded blocks are indicated by hatching). Then, once the second stored recording data (the block 2 in FIG. 11 (2b)) has been recorded on the recording medium (3a), the image data for the next seventh block is stored in the empty area of the recording buffer (3b). Similarly, as the recording is performed on a block basis, data stored in the recording buffer 4 is sequentially read while data is written. Thus, the recording in the horizontal scanning direction is performed while the recording areas of the recording buffer are recycled.

Returning to FIG. 2, description of the control blocks will be continued. Of the data stored in the reception buffer 2, the "command", "data length" and "setting data" are setting values for control of the recording apparatus. They are read from the interface controller 1 by a CPU 9 through a signal line S902 and are set for respective control circuits 7 and 8 shown in the figure (S903, S907). The CPU 9 interprets the data that has been read (data corresponding to 801 to 808 in FIG. 8A) and supervises the entire recording control of the recording apparatus according to the result. The CPU 9 also activates a data decompression block 3 to cause it to process the image data.

The data decompression block 3 reads three types of data, "compression TAG" "data" and "color change code" shown in FIG. 8B from the reception buffer 2 (through signal line S3) and controls data decompression based on them. In this embodiment, PackBits compression is used for data compression/decompression. Therefore, if the compression TAG is a value from 00h to 7Fh in 8 bits, the data area is processed as having 128 discontinuous data items starting from 1. If the compression TAG is a value from FFh to 81h in 8 bits, the next 1 byte data is decompressed into 128 continuous data items starting from 2. if 80h is read at the compression TAG, the data is processed as the color change code. The decompressed data is put on a signal line S4 and written to the recording buffer 4.

The decompressed image data is stored in the recording buffer 4 in the data structure as shown in the figure. At the start address of the recording buffer 4, data at the top of the first color data item of the first block is written. The following data is sequentially written with the address incremented one by one. The size of an area in the recording buffer in which one color data item can be stored according to the address is set by the setting data that has been initially read by the CPU 9, and data exceeding that value cannot be written. Therefore, when the image data is compressed, the data size is limited to the size defined by the setting data. Once the color change code has been detected, the second color data is sequentially written from its top address. This address data is controlled by the recording buffering mechanism control circuitry 8, which will be described later.

In this manner, the writing operation is repeated for the first to eighth color data items of the first block. The color change data detected after the eighth color data indicates that all data items of the first block have been written. The data decompression block 3 completes the data decompression and causes interruption to the CPU 9 to inform the CPU 9 of the completion of the data for one block. It then waits for the next activation by the CPU 9 for data decompression.

When a plurality of blocks of the image data are ready in the recording buffer 4, the CPU 9 operates a scanning motor (not shown) to start recording. While the recording head 6 scans, the image data is transferred and recorded in synchronization with a carriage encoder (CR encoder) 10. Thus, the image can be formed on the paper (the recording medium). Once the recording head 6 scans in the horizontal scanning direction, conveying means conveys the recording medium in the vertical scanning direction. In this manner, the recording head scans and the conveying means conveys the recording medium repeatedly to record the image for one page.

A recording data generation block 5 reads the block structures of the image data in the recording buffer 4 through a signal line S5 according to the values specified by the CPU 9 in synchronization with the CR encoder 10. It then converts the data structures into those that can be recorded by the recording head 6 and outputs them to a signal line S6.

Thus, the interface controller 1 writes the data to the reception buffer 2, and the data decompression block 3 reads only the image data. The write address and the read address are controlled by the reception buffering mechanism control circuit 7. The reception buffering mechanism control circuit 7 manages the start and end addresses and the write and read addresses of the reception buffer 2.

The reception buffering mechanism control circuit 7 increments the address by one each time it accepts a write request signal S701 from the interface controller 1. It outputs the address as write address information to the reception buffer 2 (a signal line S702). When the write address reaches the end address of the reception buffer 2, the reception buffering mechanism control circuit 7 returns the write address to the start address.

When the write address reaches (matches) the read address, the reception buffering mechanism control circuit 7 informs the interface controller 1 through a signal line S703 that the reception buffer 2 is full and cannot accept any more data.

The reception buffering mechanism control circuit 7 simultaneously informs the CPU 9 through an interruption signal on a signal line S904 that the reception buffer 2 cannot accept data. The CPU 9 can configure the reception buffer 2 by writing the configuration to an internal buffer using a bus of a signal line S903.

The read address is output to the reception buffer 2 through a signal line S706 incremented by one when the CPU 9 directly reads the data in the reception buffer 2 through a data read register in the reception buffering mechanism control circuit 7, or when the data decompression block 3 requests the data through a data read request signal line S705.

When the read address reaches the end address, the reception buffering mechanism control circuit 7 returns the read address to the start address of the reception buffer 2. When the read address reaches (matches) the write address, the reception buffering mechanism control circuit 7 informs the data decompression block through a signal line S704 that no more data can be read because the reception buffer has no data. It simultaneously informs the CPU 9 through an interruption signal on the signal line S904 that no more data can be read from the reception buffer 2.

Thus is the processing for controlling writing and reading of the data to and from the reception buffer 2. Next, description will be given of processing for writing the data to the recording buffer after the data has been read from the reception buffer 2 and decompressed, and processing for reading the data from the recording buffer.

The data decompression block 3 writes the image data to the recording buffer 4, and the recording data generation block 5 reads the image data written. The write address and the read address are controlled by the recording buffering mechanism control circuit 8.

The recording buffering mechanism control circuit 8 manages the start and end addresses and the write and read addresses of the recording buffer.

The recording buffering mechanism control circuit 8 increments the address by one each time it accepts a write request signal S801 from the data decompression block 3. It outputs the address as write address information to the recording buffer 4 (a signal line S802). When the write address reaches the end address of the recording buffer 4, the recording buffering mechanism control circuit 8 returns the write address to the start address.

When the write address reaches (matches) the read address, the recording buffering mechanism control circuit 8 informs the data decompression block 3 through a signal line S803 that the recording buffer 4 is full and cannot accept any more data.

When the data decompression block 3 has read the color change code from the reception buffer 2, the data decompression block 3 informs the recording buffering mechanism control circuit 8 of it through a signal line S804. The recording buffering mechanism control circuit 8 prepares to output a top address of an area for storing the data of the next color through the signal line S802. The CPU 9 can configure the recording buffer 4 by writing the configuration to an internal register using a bus of a signal line S907.

The read address is incremented by one and output to the recording buffer 4 through a signal line S806 when the recording data generation block 5 requests the data for each color through a data read request signal line S805.

When the read address reaches the end address, the recording buffering mechanism control circuit 8 returns the read address to the start address of the recording buffer 4.

The recording data generation block 5 sets in its internal register the data structure of the image data block that it is reading. The data structure is obtained from the CPU 9 through a bus of a signal line S908. When the recording data generation block 5 reads all image data items in the structure of the image data block that has been set, it transmits a termination signal S909 to the CPU 9 as an interruption signal. If a next image data block is already loaded in the recording buffer 4, the structure of that image data block is written to the register.

Because the CPU controls writing of the data on a basis of image data blocks and does not activate the recording data generation block for an image data block yet to be written, the read address of the recording buffer 4 never overreaches the write address. Thus is the outline of the process flow for the recording data in the recording control section.

Figure 10:
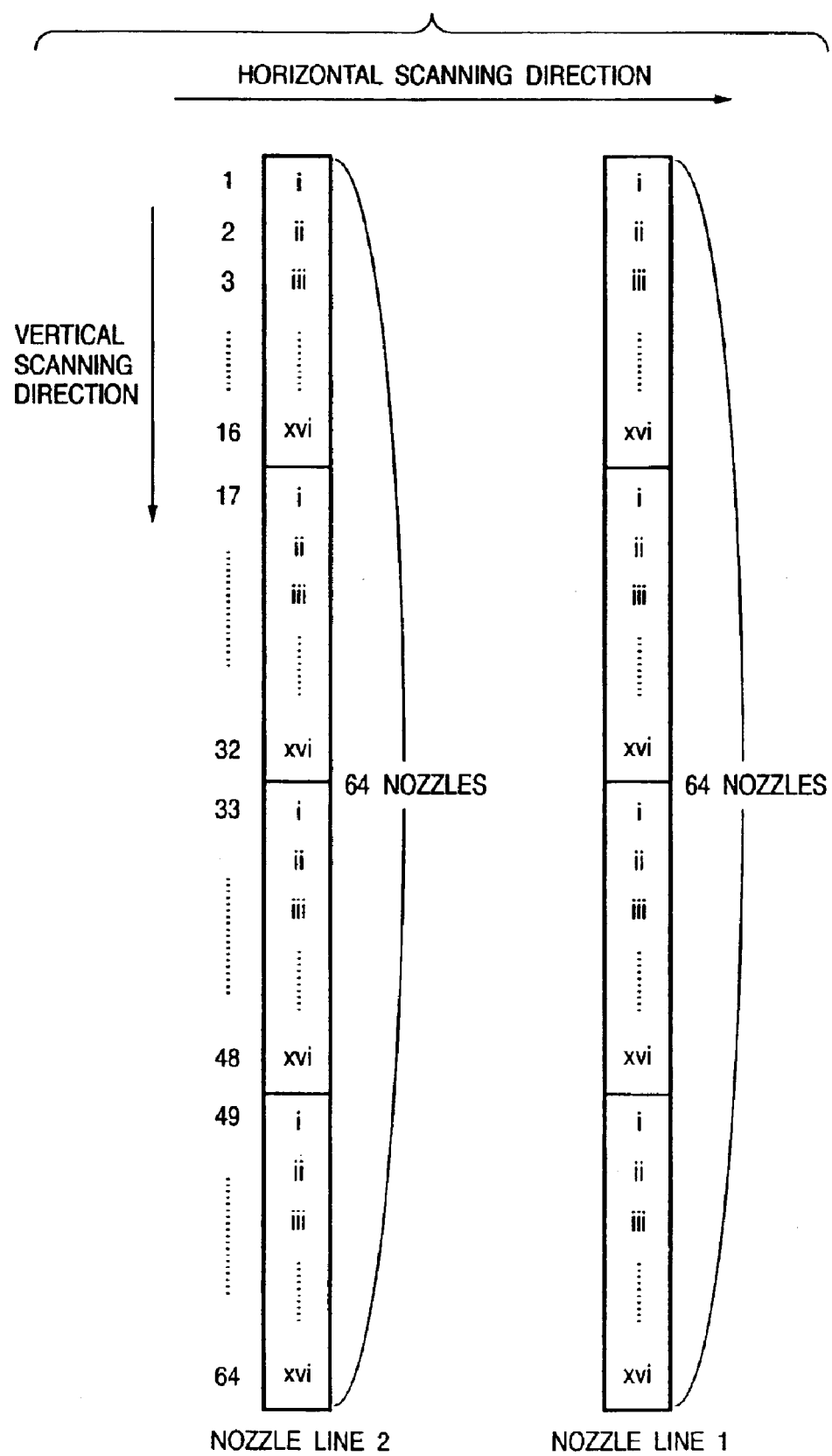
FIG. 10 describes an arrangement of nozzles of a recording head attachable to the recording apparatus according to a preferable embodiment of the invention.

FIG. 10 describes a configuration of the nozzle lines of the recording head. This nozzle arrangement, corresponding to 600 DPI, has 64 nozzles per line. Each color is recorded by using two nozzle lines. The numerals 1 to 16 in the figure indicate timings of ink discharges, wherein the nozzles of the same number simultaneously discharge the ink. These numerals 1 to 16 correspond to the control for correcting tunings by dividing a heat timing cycle into 16 periods as shown in FIG. 3B. The nozzle lines for each color (four colors of cyan, yellow, magenta, and black) are arranged in the horizontal scanning direction of the recording head. Then, registration error correction (regi-adjustment) in fractions of a pixel by the nozzle lines are performed by obtaining certain heat timings based on a unit time (t) such as a unit time resulting from division by 16 as shown in FIG. 3B (e.g., t1=5×t), and controlling the ink discharges of each nozzle line with those heat timings. This timing correction is performed for regi-adjustment in the same manner for both the nozzle lines of the same color and the nozzle lines of different colors. The recording data generation block 5 performs above-mentioned processing in order to convert the data structures into those that can be recorded by the recording head 6.

Figure 7A:
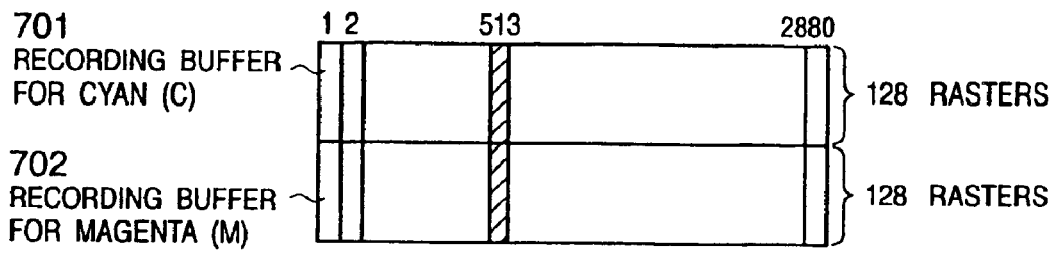
FIGS. 7A and 7B describe a conventional regi-adjustment, and FIGS. 7C and 7D describe a regi-adjustment in fractions of a pixel for data stored in a recording buffer in the first embodiment.
Figure 7B:
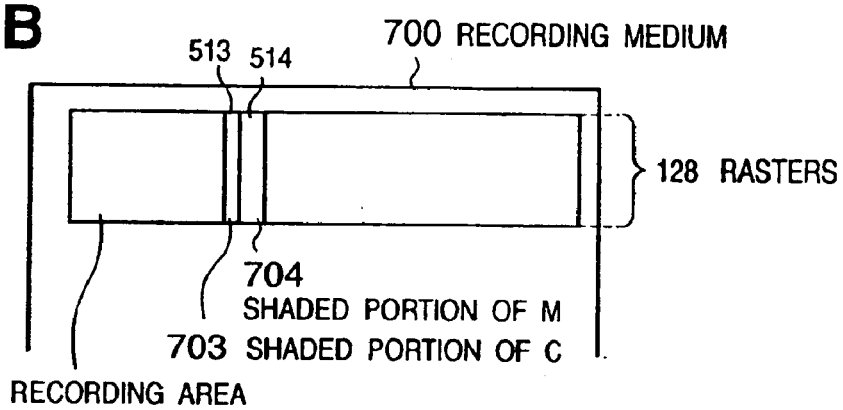
Figure 7C:
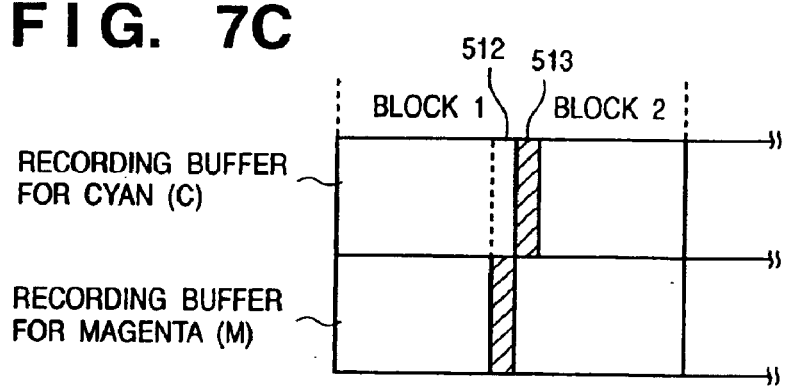
Figure 7D:
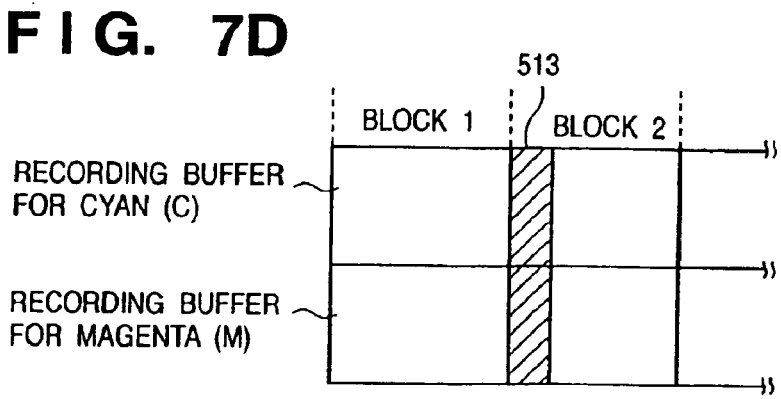

However, when writing and reading of the image data is controlled on a block basis, a regi-error of one pixel between a cyan pixel and a magenta pixel as in the prior art shown in FIG. 7B cannot be adjusted in the manner shown in FIG. 7D, in which the image data for cyan and the image data for magenta are stored at the 513th column, the first column of the block 2, and the magenta data is read earlier by one pixel. The reason is that control of the block-based buffer involves writing the next data to a block whose data has been recorded as described with reference to FIG. 11.

Therefore, as shown in FIG. 7C, the magenta (M) data is stored at a location shifted by one column from the cyan (C) data. That is, the magenta (M) data is stored at the 512th column. This allows the shaded areas of cyan and magenta to be recorded at the same position corresponding to the 513th column. To achieve this, the recording apparatus informs the host of a known regi-error amount in advance, and the host generates the image data for each color based on the regi-error amount and transmits the generated image data to the recording apparatus. Then, the recording apparatus can perform recording without regi-errors in pixels. This can also be applied to other colors such as yellow and black.

Now, referring to FIG. 1, a description will be given of a data flow between a host computer 1000 (referred to as a "host" hereafter) and the recording apparatus 1500 on start of recording.

When the host 1000 issues an instruction to start recording to the recording apparatus, it first requests information on registration errors (regi-errors) of the recording head from the recording apparatus 1500 (S100). In response to the request, the recording apparatus 1500 returns the information on the regi-errors to the host (S110).

Based on the received information on the regi-errors, the host 1000 generates image data corrected for the regi-errors in pixels (coarse adjustment). The host 1000 further generates setting data, commands, and so on for allowing the recording apparatus 1500 to process the image data (S115). The image data generated by the host is data in a raster form; therefore, for example, null data "0" is added to the image data to delay a recording timing by one pixel in the scanning direction. Conversely, null data is removed to advance a recording timing. To advance the timings of other nozzle lines relative to a reference nozzle line of regi-adjustment, null data may be inserted before the first column of the image data for the reference nozzle line to shift the relative relationships of the data arrangements. This provides the same effect as the above removal of the null data.

Figure 1:
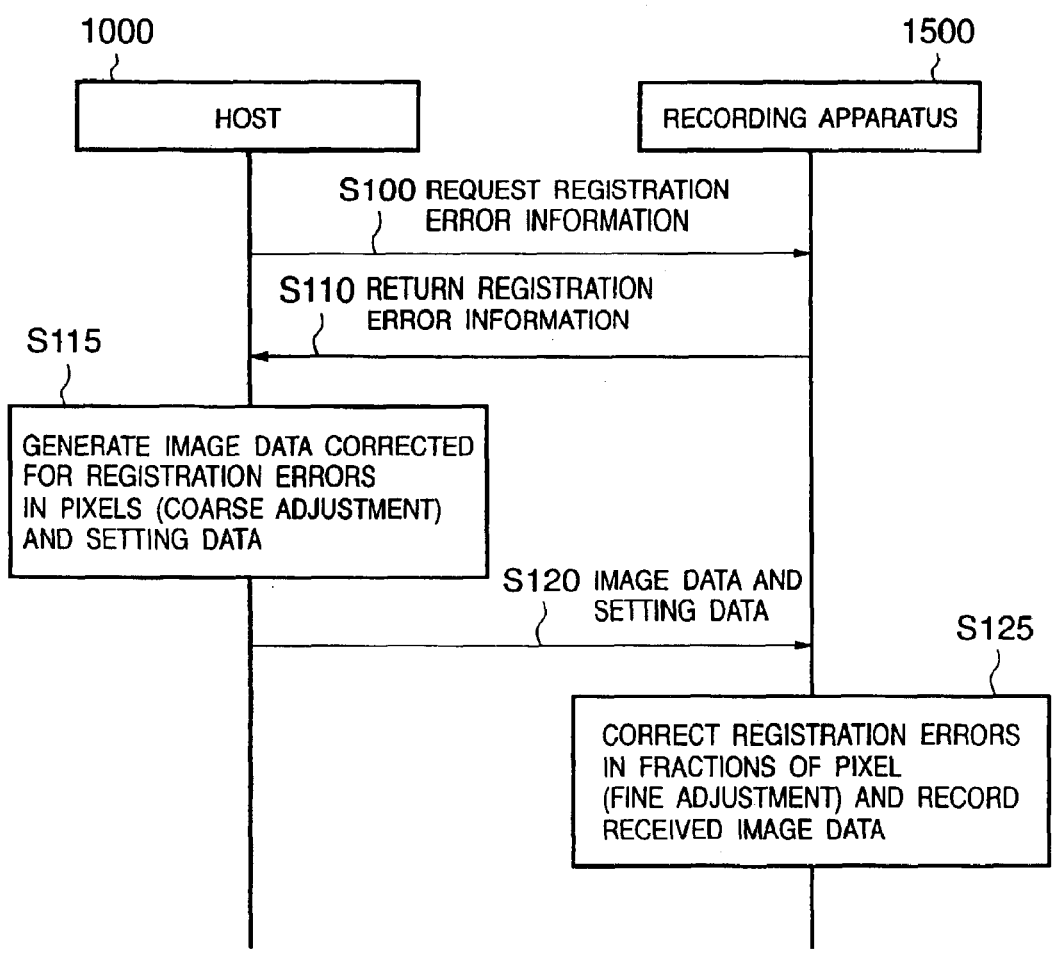
FIG. 1 describes a data flow between a host computer and a recording apparatus 1500 in a first embodiment.
Figure 4A:
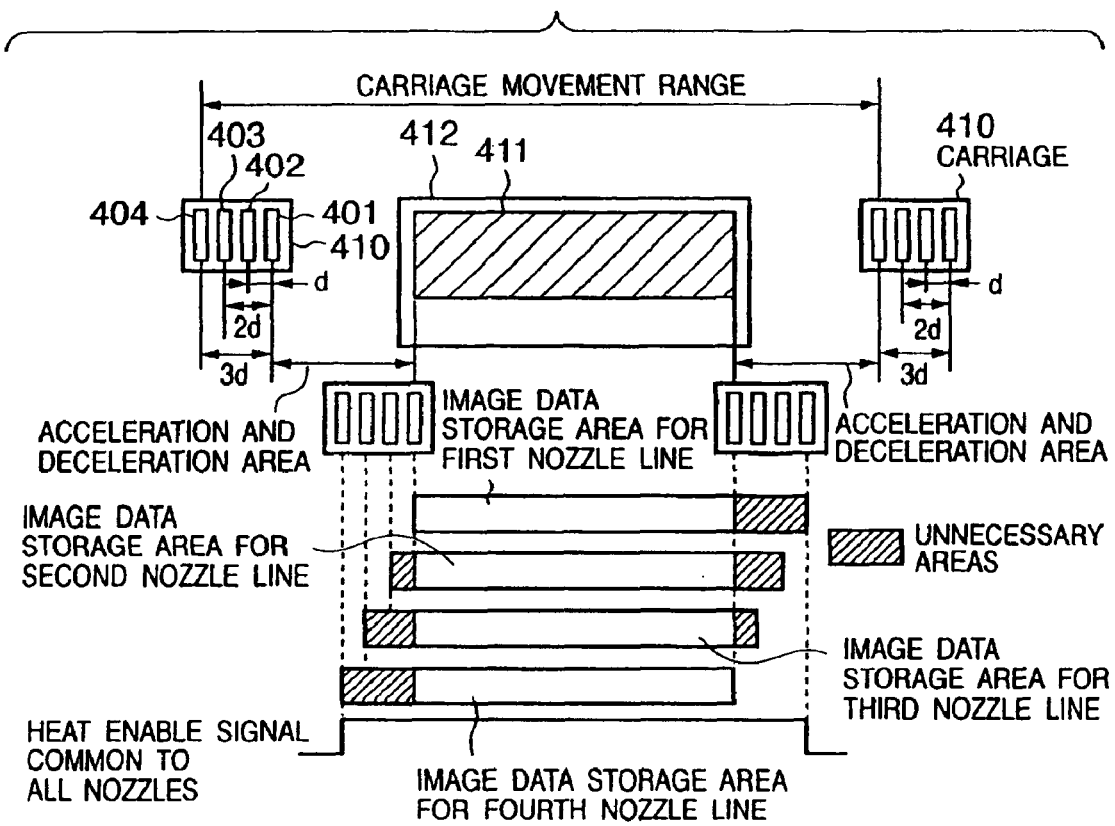
FIGS. 4A and 4B describe how to store image data regarding saving a memory capacity in a conventional recording apparatus.
Figure 4B:
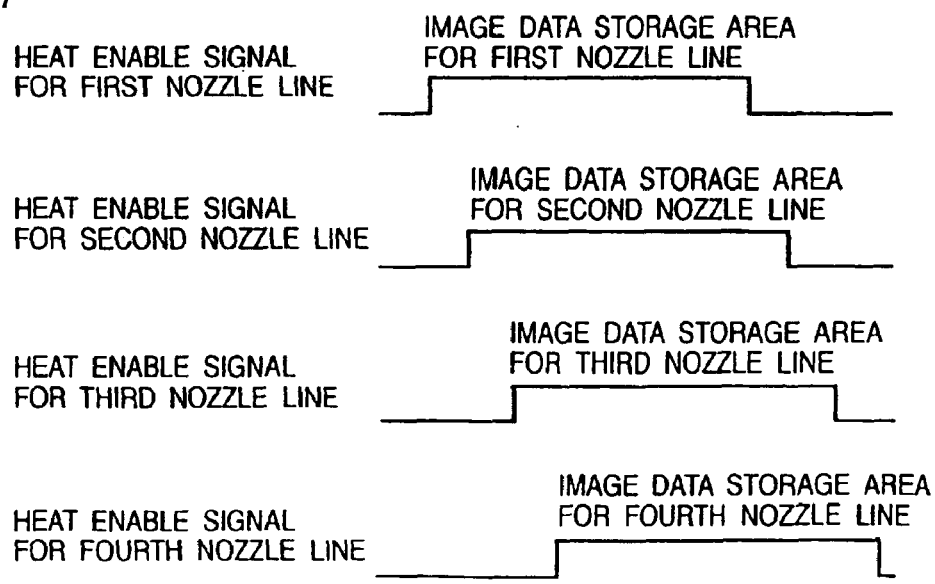

In step S120 of FIG. 1, the image data corrected for its regi-errors in pixels (coarse adjustment) and the data such as the setting data are transmitted to the recording apparatus.

The data such as the setting data may include information on indication of the coarse adjustment so that the recording apparatus can recognize that the coarse adjustment has been made.

The setting data generated by the host 1000 includes above-described information for allowing the recording apparatus to process and record the image data; for example, information for controlling writing and reading of the data to and from the buffers of the recording apparatus. This information further includes correction information for correcting the registration errors in fractions of a pixel, for example, in units of ½ pixel. The recording apparatus 1500 corrects the registration errors in fractions of a pixel (fine adjustment) based on the received setting data and performs recording (S125).

Thus, with the above processing, the registration adjustment in pixels and the correction of the registration errors in fractions of a pixel can be achieved. Cooperation between the host 1000 and the recording apparatus 1500 to correct the registration errors can reduce the data processing load on the recording apparatus and provides efficient utilization of memory areas in the recording apparatus.

It is to be understood that the resolution at which the registration errors are corrected by the recording apparatus is not limited to ½ pixel. The correction is possible by any heat timings according to a unit that resolves the registration errors in fractions of a pixel, for example, a unit based on one pixel divided by 16 as shown in FIG. 3B.

Figure 5:
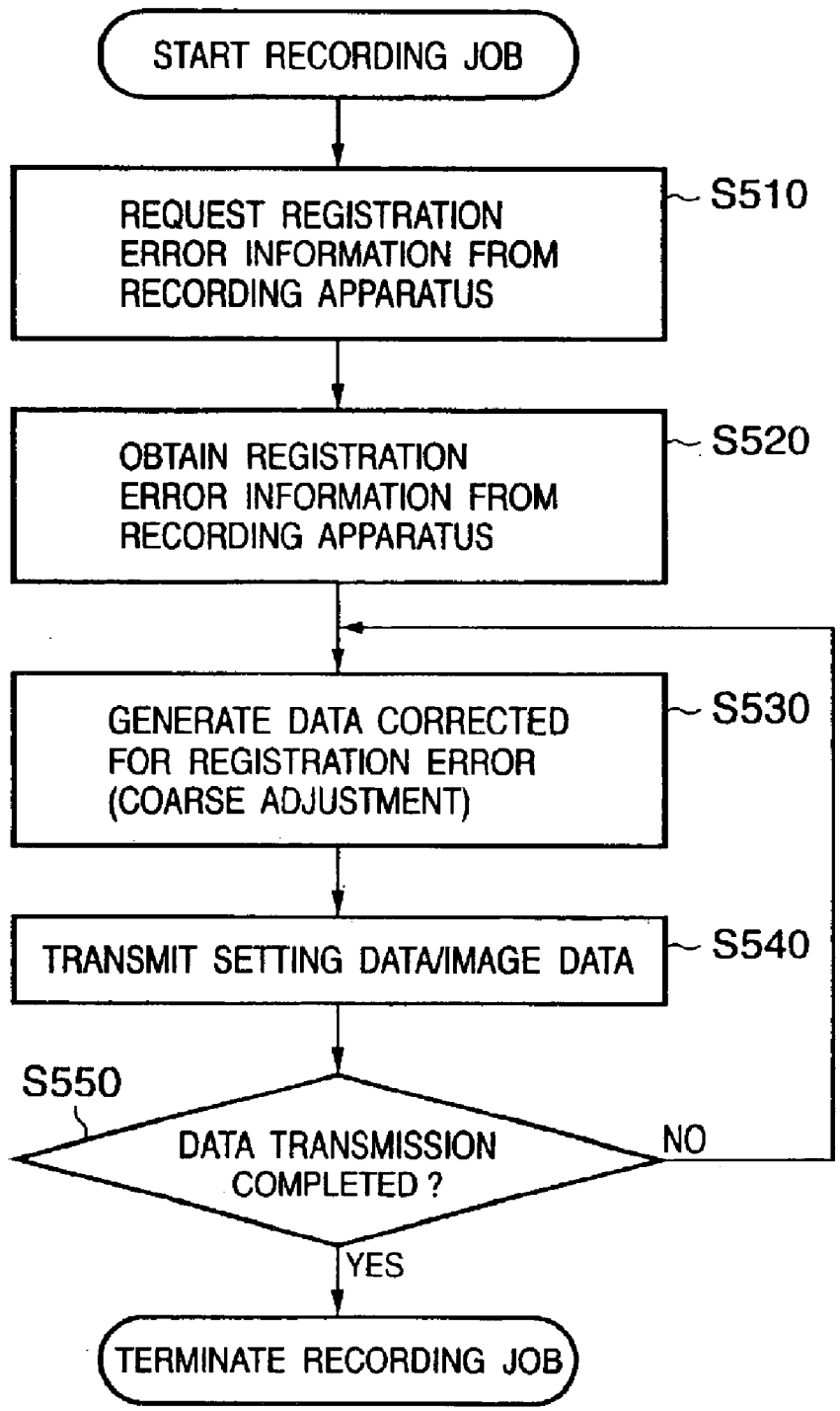
FIG. 5 is a flowchart describing a flow of data processing performed by the host in the first embodiment.

FIG. 5 is a flowchart showing the processing of the host in the above-described operations. The host requests the information on the registration errors of the image (regi-information) from the recording apparatus in step S510 and receives the information transmitted from the recording apparatus in step S520.

In step S530, based on the received regi-information, the host generates the blocked image data corrected for its registration errors in pixels for registration error correction. The blocked image data includes the first to eighth color data items stored with the color change codes separating them as shown in FIG. 8B.

In step S540, the setting data is generated for allowing the recording apparatus to process the blocked image data generated in step S530, and the setting data and the image data are transmitted to the recording apparatus. The setting data includes the correction information on the image generated by the host for resolving the registration errors in fractions of a pixel, for example, in units of ½ pixel.

The correction information includes, for example, information for controlling the heat timings (t1 and t2) shown in FIGS. 3A and B recording in fractions of a pixel.

After the data has been transmitted, it is determined in step S550 whether all image data items have been generated. If any image data item is yet to be generated, the processing returns to step S530 and the image data generation is repeated. If data transmission has been completed (S550-Yes), the recording job terminates.

Figure 6:
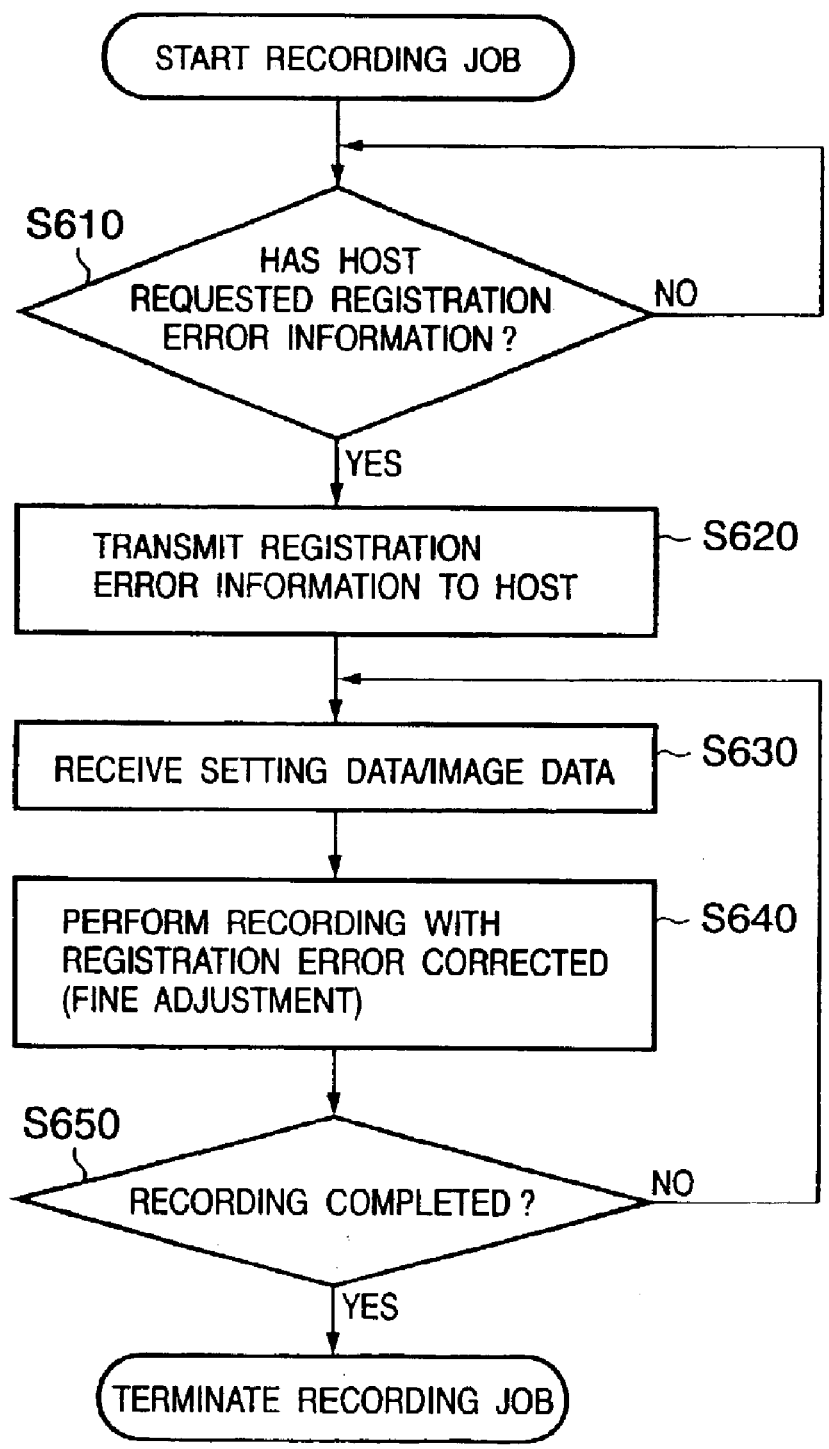
FIG. 6 is a flowchart describing a flow of data processing for recording performed by the recording apparatus in the first embodiment.

FIG. 6 is a flowchart describing the processing of the recording apparatus. In step S610, the recording apparatus determines whether the host has requested information on registration errors (regi-errors). If the information has been requested (S610-Yes), the processing proceeds to step S620, where the stored information on the regi-errors is transmitted to the host. For example, the information on the regi-errors is the nozzle line numbers and the amount of misalignment of recording pixels corresponding to the nozzle line numbers. These values may be directly returned to the host so that they are reflected in the correction to be made by the host. Otherwise, if the values are not directly transmitted to the host, data related to the values may be transmitted to the host, which may then obtain the nozzle line numbers and the corresponding amount of regi-errors based on the data. The information related to the nozzle line numbers and the amount of regi-errors corresponding to the nozzle line numbers maybe an apparatus model ID, a head ID, an apparatus version number, a lot number, a factory-preset default regi-setting value, and so on.

Then, the image data corrected in pixels by the host (coarsely regi-corrected data) and data such as the setting data are received in step S630. In step S640, recording is performed with the correction information for correcting the regi-errors in fractions of a pixel (fine adjustment) This fine adjustment is based on the correction information for resolving the regi-errors in fractions of a pixel, for example, in units of ½ pixel for the image data generated by the host.

Here, the image data is block data for each of the partial areas resulting from dividing the area in the horizontal scanning direction, and the correction result is added to the block data. To correct the registration errors, null data ("0" data) is added or removed to or from the color data items included in each block data item so that the block data items align. Thus, data for controlling the recording positions in pixels is generated. The blocked image data are written to and read from the memory (2 or 4 in FIG. 2) under control according to the setting data transmitted from the host (7 and 8 in FIG. 2).

Thus, addition or removal of null data controls the write address of the buffer, and the image data is stored with its regi-errors corrected. The image data is read and recorded as data corrected for its registration errors in fractions of a pixel (S640).

The image data that has been read based on the read address information is image data corrected for its registration errors in the horizontal scanning direction of the recording head that discharges the ink and performs recording.

In step S650, it is determined whether all image data items have been recorded. If the recording has not been completed (S650-No), the processing returns to step S630, where the next image data item is received.

If all image data items have been processed (S650-Yes), the recording job terminates.

As described above, this embodiment enables the regi-adjustment in pixels and the correction of registration errors in fractions of a pixel. Cooperation between the host and the recording apparatus to correct the registration errors can reduce the data processing load on the recording apparatus and provides efficient utilization of memory areas in the recording apparatus.

The host corrects registration errors in pixels. The recording apparatus holds data as blocks, each of which includes the color data items, and controls writing and reading of the data to and from its recording buffers that have a data capacity for less than one scan. Thus, the recording apparatus can record the data corrected for its registration errors in fractions of a pixel.

[Second Embodiment]

In the first embodiment, the recording apparatus holds and manages the information on the registration errors (regi-information). In this case, the information on the registration errors is held in a non-volatile memory and managed by the recording apparatus. Instead, the regi-information may be held at the host. For example, if several recording apparatuses are connected to the host as in the cases of a printer server host and a host with several interfaces, the host may be provided with apparatus model IDs for identifying the recording apparatuses, and hold and manage the plural pieces of regi-information for each ID.

In this case, when the host receives a recording instruction for one of the recording apparatuses, the host may transmit correction data for registration error correction in pixels along with data subjected to regi-correction (coarse adjustment) to that recording apparatus. Then, the recording apparatus can correct the registration errors in fractions of a pixel (fine adjustment) in the same manner.

If different types of recording heads can be attached to the recording apparatus, the recording apparatus may hold registration data for each of these recording heads. The type of a recording head being attached may be determined from an identification ID unique to the head, so that the regi-information for that recording head may be determined.

It is also possible to hold several sets of an ID for identifying an interface to be used, head nozzle line numbers, a pixel unit corresponding to each nozzle line number, and a regi-error amount in fractions of a pixel.

In the above described embodiment, correction is made in units of ½ pixel based on the timing signal obtained from a cycle divided by 16 as an example of the regi-adjustment in fractions of a pixel. However, it is to be understood that the resolution of the correction is not limited to this but may be ¼ pixel or other values.

Also in the above described embodiment, the host requests the information on regi-errors from the recording apparatus just before the start of recording; however, the request is not limited to this timing. For example, the host may make the request when the recording apparatus first connects to the host, when the recording apparatus is powered on after connecting to the host, when the recording head is changed, when processing for regi-adjustment is performed, when a predetermined duration has passed since the last request, and so on. In contrast, even when the host is supposed to request the information on regi-errors just before the start of recording, the host may skip the request if a predetermined duration (for example, one hour) has not passed since the last request.

The host may also include a routine for confirming data received from the recording apparatus. For example, the host may determine whether the obtained regi-error data is out of a predetermined range of values. When such a sequence is added, a sequence may further be added for informing a user in the case of an error and setting a default value (after receiving acknowledgement from the user).

It may also be possible to encode the regi-error data to be transmitted by the recording apparatus so that the error correction can be performed in a predetermined sequence, and to decode the data at the host. Further, it may be possible to transmit information such as the temperature of the recording apparatus and the total scan number of the carriage as the regi-error information to the host, which then makes fine modification.

In these embodiments, droplets discharged from the recording head are ink, and the liquid contained in the ink tank is also ink. However, the content is not limited to ink. For example, the content of the ink tank may be some kind of processing liquid discharged at the recording medium to enhance fixation or water resistance of the recorded image or to enhance the image quality.

Among other ink-jet recording techniques, these embodiments may employ a technique that involves means for generating thermal energy as energy used for discharging ink (for example, an electrothermal transducer or a laser beam) and causes a change in the ink state with the thermal energy. This provides recording with a high density and a high definition.

As to representative configurations and principles of this technique, the technique is preferably based on basic principles such as disclosed in U.S. Pat. No. 4,723,129 and U.S. Pat. No. 4,740,796. While the technique is applicable to both of what are called the on-demand type and the continuous type, the on-demand type is especially effective. The on-demand type involves applying at least one driving signal to an electrothermal transducer placed appropriately for a sheet or a stream where a liquid (ink) is kept. The driving signal corresponds to recording information and causes a rapid increase in temperature above a nucleate boiling point. The application of the driving signal causes the electrothermal transducer to produce thermal energy, which causes film boiling on a heating surface of the recording head. As a result, an air bubble in one-to-one correspondence with the driving signal is formed in the liquid (ink).

The growing and shrinking air bubble causes the liquid (ink) to be discharged through discharge orifices, thereby forming at least one droplet. A driving signal in the form of a pulse is more preferable because it allows the air bubble to immediately grow and shrink in an appropriate manner and achieves a discharge of the liquid (ink) with good response.

As this driving signal in the form of a pulse, signals described in U.S. Pat. No. 4,463,359 and U.S. Pat. No. 4,345,262 are suitable. Further improved recording is possible with adoption of conditions described in U.S. Pat. No. 4,313,124 that relates to an invention related to the temperature increase rate of the heating surface.

Besides a combination of discharge orifices, liquid stream, and electrothermal transducer (linear or right-angled liquid stream) as disclosed in the above mentioned specifications, the configuration of the recording head of the invention also includes configurations described in U.S. Pat. No. 4,558,333 and U.S. Pat. No. 4,459,600, in which the heating surface is placed in a bent area. In addition, the configuration may be based on Japanese Patent Laid-Open No. 59-123670 that discloses a configuration in which common slots are provided as discharge orifices for a plurality of electrothermal transducers, or Japanese Patent Laid-Open No. 59-138461 that discloses a configuration in which an opening that absorbs pressure waves of the thermal energy is associated with a discharge unit.

If the recording head used is of a full line type with a length corresponding to the maximum width of a recording medium recordable by the recording apparatus, it may be configured to meet the length by a combination of a plurality of recording heads such as those disclosed in the above-mentioned patents, or it may be configured as an integrally formed recording head.

In addition, the recording head is not limited to a cartridge type with the ink tank integrally incorporated in the recording head as described in the above embodiment. Instead, a changeable recording head of a chip type may be used, in which case attaching the recording head to the apparatus enables electrical connection to the apparatus or ink supply from the apparatus.

Additional means such as recovery means for the recording head or auxiliary means for the above-described configuration of the recording apparatus is preferable in that it increases stability of the recording operation. Examples of the means include capping means, cleaning means, and pressurization or suction means for the recording head, as well as auxiliary heating means that consists of an electrothermal transducer, other heating elements, or a combination thereof. It is also advantageous for stable recording to provide an auxiliary discharge mode for discharging independently of recording.

The recording apparatus may have a recording mode of only a main color such as black, as well as at least one of a multiple color mode of different colors and a full color mode of mixed colors. The multiple or full color mode may be achieved either with an integrally configured recording head or a combination of recording heads.

Although the ink used in the above-described embodiments is liquid, the ink used may be that which is solidified at room temperature or below, or that which is softened or liquefied at room temperature. Since the ink-jet techniques generally control the temperature of the ink within a range from 30° C. to 70° C. to keep the viscosity of the ink within a range that allows stable discharging, any ink may be used that is in a liquid state when the recording signal used is applied.

In addition, ink that is normally solid and liquefied by heat may be used in order to positively prevent increase in temperature due to the thermal energy by utilizing the thermal energy as energy for the ink to change from a solid state to a liquid state, as well as in order to prevent the ink from evaporating. At any rate, the invention may be applied to the cases where the ink is liquefied only when the thermal energy is provided, for example, where the ink is liquefied by application of the thermal energy corresponding to the recording signal and discharged as a liquid, or the ink begins to be solid before reaching the recording medium.

In this case, the ink may be kept as a liquid or solid in concavities or holes in a porous sheet and opposed to the electrothermal transducer as described in Japanese Patent Laid-Open No. 54-56847 or Japanese Patent Laid-Open No. 60-71260 or U.S. Pat. No. 4,608,577. In the present invention, the most effective scheme for the foregoing inks is that involving the above-described film boiling.

Further, the recording apparatus according to the invention may take a form of an image output terminal incorporated in or attached to an information processing appliance such as a computer, as well as a form of a copier combined with a reader or the like, or a facsimile with transmission and reception capabilities.

Thus, according to the image formation system, recording apparatus, and method for controlling the recording apparatus provided by the invention, the regi-adjustment in pixels and the correction of the registration errors in fractions of a pixel are possible. Cooperation between the information processing apparatus and the recording apparatus to correct the registration errors can reduce the data processing load on the recording apparatus and provides efficient utilization of memory areas in the recording apparatus.

The information processing apparatus corrects the registration errors in pixels. The recording apparatus holds data as blocks, each of which includes the color data items, and controls writing and reading of the data to and from its recording buffers that have a data capacity for less than one scan. Thus, the recording apparatus can record the data corrected for its registration errors in fractions of a pixel.

As many apparently widely different embodiments of the present invention can be made without departing from the spirit and scope thereof, it is to be understood that the invention is not limited to the specific embodiments thereof except as defined in the claims.

What is claimed is:

1. An image formation system having an information processing apparatus that generates block data and a recording apparatus that divides a recording area of a recording medium in a scanning direction of a recording head having a plurality of nozzle arrays into a plurality of partial areas and stores block data for each of the partial areas in a buffer in order to perform recording by the recording head, wherein
the information processing apparatus comprises:
input means for inputting information with respect to a registration error between the nozzle arrays outputted from the recording apparatus;
first correction means for correcting a recording position of block data for each partial area of the recording medium, the correction being made for each pixel of the nozzle arrays; and
generation means for generating the block data that conforms to the recording position corrected by the first correction means and generating setting information for controlling the recording apparatus to record the block data, and
the recording apparatus comprises:
second correction means for correcting the recording position of the block data in fractions of a pixel based on the setting information generated by the generation means; and
recording control means for controlling recording of the block data based on the recording position corrected by the second correction means.

2. The image formation system according to claim 1, wherein the recording position of the image data corrected in fractions of a pixel by the second correction means are corrected at a resolution of 1 pixel/n (n: an integer larger than 1).

3. The image formation system according to claim 1, wherein at least one ink of cyan, yellow, magenta, and black is discharged from the nozzle arrays.

4. The image formation system according to claim 1, wherein the information processing apparatus stores a plurality of correction information items for correcting the color data items in pixels by the first correction means, and
the first correction means determines a first correction information item corresponding to the recording apparatus that records the image data.

5. The image formation system according to claim 1, wherein the information with respect to the registration error between the nozzle arrays outputted from the recording apparatus is output to the information processing apparatus as requested by the information processing apparatus.

6. The image formation system according to claim 1, wherein the setting information includes a heat timing cycle for driving a nozzle line of a recording head in fractions of a pixel.

7. The image formation system according to claim 1, wherein the information with respect to the registration error includes at least one of an apparatus model ID, a head ID, an apparatus version number, a lot number, and a factory-preset default regi-setting value.

8. The image formation system according to claim 1, wherein a capacity of the buffer disposed in the recording apparatus is less than the block data corresponding to one scan of the recording head.

9. A recording control method for controlling an image formation system having an information processing apparatus that generates block data and a recording apparatus that divides a recording area of a recording medium in a scanning direction of a recording head having a plurality of nozzle arrays into a plurality of partial areas and stores block data for each of the partial areas in a buffer in order to perform recording by the recording head, the method comprising:
an input step of inputting information with respect to a registration error between the nozzle arrays outputted from the recording apparatus into the information processing apparatus;
a first correction step of correcting a recording position of block data for each partial area of the recording medium, the correction being made for each pixel of the nozzle arrays;
a generation step of generating the block data that conforms to the recording position corrected by processing in the first correction step and generating setting information for controlling the recording apparatus to record the block data;
a second correction step of correcting the recording position of the block data in fractions of a pixel based on the setting information generated by processing in the generation step; and
a recording control step of controlling recording of the block data based on the recording position corrected by processing in the second correction step.

10. An image formation system having an information processing apparatus that generates image data and a recording apparatus that divides a recording area of a recording medium in a scanning direction of a recording head having a plurality of nozzle arrays into a plurality of partial areas and stores block data for each of the partial areas in a buffer in order to perform recording by the recording head, wherein
the information processing apparatus comprises:
first input means for inputting information with respect to a registration error between the nozzle arrays outputted from the recording apparatus;
generation means for generating block data which is corrected in pixels based on the information with respect to the registration error and generating setting information used for correcting a recording position with respect to the recording medium in fractions of a pixel;
output means for outputting the block data and the setting information to the recording apparatus, and
the recording apparatus comprises:
second input means for inputting the block data and the setting information; and
recording control means for controlling recording of the block data based on the setting information.

11. The image formation system according to claim 10, wherein the information with respect to the registration error includes at least one of an apparatus model ID, a head ID, an apparatus version number, a lot number, and a factory-preset default regi-setting value.

12. The image formation system according to claim 10, wherein a capacity of the buffer disposed in the recording apparatus is less than the block data corresponding to one scan of the recording head.

13. An information processing apparatus that outputs block data to a recording apparatus that divides a recording area of a recording medium in a scanning direction of a recording head having a plurality of nozzle arrays into a plurality of partial areas and stores block data for each of the partial areas in a buffer in order to perform recording by the recording head, wherein
the information processing apparatus comprises:
input means for inputting information with respect to a registration error between the nozzle arrays outputted from the recording apparatus;
generation means for generating block data which is corrected in pixels based on the information with respect to the registration error and generating setting information used for correcting a recording position with respect to recording medium in fractions of a pixel; and
output means for outputting the block data and the setting information to the recording apparatus.

14. The image formation system according to claim 13, wherein the information with respect to the registration error includes at least one of an apparatus model ID, a head ID, an apparatus version number, a lot number, and a factory-preset default regi-setting value.

15. A recording control method for controlling an information processing apparatus that outputs block data to a recording apparatus that divides a recording area of a recording medium in a scanning direction of a recording head having a plurality of nozzle arrays into a plurality of partial areas and stores block data for each of the partial areas in a buffer in order to perform recording by the recording head, the method comprising:
an input step of inputting information with respect to a registration error between the nozzle arrays outputted from the recording apparatus into the information processing apparatus;
a generation step of generating block data which is corrected in pixels based on the information with respect to the registration error and generating setting information used for correcting a recording position with respect to the recording medium in fractions of a pixel; and
an output step of outputting the block data and the setting information to the recording apparatus.

* * * * *

UNITED STATES PATENT AND TRADEMARK OFFICE
CERTIFICATE OF CORRECTION

| | |
|---|---|
| PATENT NO. | : 6,913,337 B2 |
| APPLICATION NO. | : 10/413485 |
| DATED | : July 5, 2005 |
| INVENTOR(S) | : Kuronuma et al. |

It is certified that error appears in the above-identified patent and that said Letters Patent is hereby corrected as shown below:

COLUMN 3
Line 33, "recording-data" should read --recording data--.

COLUMN 4
Line 8, "the another" should read --another--.
Line 28, "the another" should read --another--.

COLUMN 5
Line 39, "a meaning," should read --meaning,--.
Line 63, "5005" (second occurrence) should read --5004--.

COLUMN 6
Line 24, "recovery" should read --recovery operations--.

COLUMN 7
Line 35, "eights" should read --eighth--.
Line 65, "seventh" should read --(seventh)--.

COLUMN 10
Line 47" tunings" should read --timings--.
Line 60, "performs" should read --performs the --.

UNITED STATES PATENT AND TRADEMARK OFFICE
CERTIFICATE OF CORRECTION

PATENT NO. : 6,913,337 B2
APPLICATION NO. : 10/413485
DATED : July 5, 2005
INVENTOR(S) : Kuronuma et al.

It is certified that error appears in the above-identified patent and that said Letters Patent is hereby corrected as shown below:

<u>COLUMN 12</u>
Line 52, "maybe" should read --may be --.
Line 59, "adjustment)" should read --adjustment).--.
Line 67, "added" should read --added to-- and "to or from" should read --from--.

Signed and Sealed this

Twenty-ninth Day of August, 2006

JON W. DUDAS
*Director of the United States Patent and Trademark Office*